United States Patent [19]
Fischer et al.

[11] Patent Number: 4,731,232
[45] Date of Patent: Mar. 15, 1988

[54] PROCESS FOR THE PURIFICATION OF INDUSTRIAL GASES OR WASTE GASES

[75] Inventors: Joachim Fischer, Rodenbach; Helmut Knorre, Seligenstadt, both of Fed. Rep. of Germany

[73] Assignee: Degussa AG, Frankfurt, Fed. Rep. of Germany

[21] Appl. No.: 888,568

[22] Filed: Jul. 23, 1986

[30] Foreign Application Priority Data
Sep. 28, 1985 [DE] Fed. Rep. of Germany ....... 3534677

[51] Int. Cl.[4] .................................. B01D 53/34
[52] U.S. Cl. .................................. 423/236; 204/1 T; 204/293; 423/224; 423/573 R; 436/150
[58] Field of Search .............. 423/236, 224, 573 R; 436/150; 204/1 K, 1 M, 1 N, 293

[56] References Cited
U.S. PATENT DOCUMENTS

| | | | |
|---|---|---|---|
| 2,859,090 | 11/1958 | Karchmer et al. | 423/236 |
| 2,912,367 | 11/1959 | Asendorf et al. | 204/1 N |
| 3,923,608 | 12/1975 | Frant et al. | 204/1 N |
| 4,211,646 | 7/1980 | Westbrook et al. | 423/236 |

FOREIGN PATENT DOCUMENTS
3412581 10/1985 Fed. Rep. of Germany ...... 423/224

OTHER PUBLICATIONS
"Electrode Indicator Technique for Measuring Low Levels of Cyanide", Frant et al., Analytical Chemistry, vol. 44, No. 13 (11-1972), pp. 2227-2230.
"Amperometric Titrations", Stock, Analytical Chemistry, vol. 46, No. 5 (4-1974), pp. 1R-7R.

Primary Examiner—John Doll
Assistant Examiner—Jeffrey Edwin Russel
Attorney, Agent, or Firm—Cushman, Darby & Cushman

[57] ABSTRACT

In purifying gas wash waters containing cyanide with formaldehyde, the exact dosing of formaldehyde presents a problem, especially with strongly fluctuating cyanide contents. By continuous potentiometric measurement in a side stream which is regulated to a pH of 7 to 10, while the pH of the main stream remains unchanged, the formaldehyde can be adjusted safely to any cyanide content.

22 Claims, 2 Drawing Figures

PROCESS FOR THE PURIFICATION OF INDUSTRIAL GASES OR WASTE GASES

BACKGROUND OF THE INVENTION

The invention is directed to a process for the purification of industrial gases or industrial waste gases which contain hydrogen cyanide, as well as frequently ammonia, and in which there can also be present carbon oxides, hydrocarbons of various structures, hydrogen sulfide, sulfur oxides as well as metal containing dusts.

These types of gases are obtained, e.g., in blast-furnace processes, acrylonitrile syntheses, garbage pyrolyses or other chemical processes and are purified by washing with aqueous formaldehyde.

The invention is directed especially to controlled dosing of the aqueous formaldehyde electrometrically.

The purification of industrial gases or waste gases is required for various reasons. On the one hand, it serves to separate dusts from valuable gases, as occurs in blast-furnace processes or garbage pyrolyses, on the other hand waste gases, as, e.g., are formed in the synthesis of acrylonitrile or other chemical syntheses, must be freed of toxic materials before passing into the atmosphere. The removal of dust from blast furnace gas frequently was carried out in a continuous-flow process. Thereby, the wash water was led after utilization over a circular thickener which simultaneously served as detoxification vessel and the clear decantate led to the sewer system or receiving stream of the sewer.

Since very large amounts of water are needed for this purpose, at present the recirculating process is preferred. Thereby, the wash water is treated with a flocculating agent after the gas washing, led over a circular thickener and the clear decantate supplied again to the washing circuit via an evaporation cooler. Fresh water is added only to compensate for evaporation losses respectively to lower the hardness of the water. Consequently, only a fraction of the wash water is used for detoxification; however, this has a substantially higher noxious material content than the wash water from the continuous-flow process. Only in very rare cases, there is carried out a pH regulation of the wash water in the circuit, so that the pH is in the neutral range. As a result, a large part of the cyanide is carried out of the evaporation cooler in the form of hydrogen cyanide.

In German OS No. 2460927 there is described a two-step process for treatment of blast furnace gas wash water which depends on measuring the content of cyanide before the sedimentation plant and then adding 20 to 70% of the amount of formaldehyde required to react stoichiometrically with cyanide forming glycol o-nitrile. The pH of the entire blast-furnace gas wash water thereby must be adjusted to between 8 and 10.

A very good intermixing in the area of addition of formaldehyde is essential for the process in order to avoid a local excess of formaldehyde which would lead to reaction with other materials, such as ammonium ions. Excesses of formaldehyde, including local excesses, however, should be avoided in every case. Therein is seen a distinctiveness of the process.

Then in a second step there is added the residual portion of the stoichiometric amount of formaldehyde needed to react with hydrogen cyanide, after the gravity separator and removal of the polymers of glycolonitrile formed in the first step, in order to detoxify complex heavy metal cyanides. For this type of process, however, there would be needed exact information to control the addition of formaldehyde, in order to avoid, e.g., the stated impermissible local excesses of formaldehyde in the presence of reactive ions, such as, e.g., ammonium ions. This type of information, however, is completely missing. However, it is necessary in regard to the strongly fluctuating cyanide content in the wash water of blast-furnace gases, e.g., according to the process for production of iron between 0.1 and 202 mg $CN^-/l$ of wash water, since a dosing according to empirical values then can no longer be carried out. Entirely apart from this even during the production itself there can occur significant fluctuations in the cyanide content. A process for the detoxification of waste water containing high concentrations of cyanide with an alkaline formaldehyde solution whose pH is at least 8 and which preferably is employed in excess over the stoichiometrically necessary amount is described in German OS No. 2119119. The carrying out of the process is technically expensive, both because of the multi-hour heating of the waste water to the boiling temperature and the standing for days at room temperature. In none of the cases is there produced a sufficient detoxification. Thus, the residual cyanide content after boiling the waste water for 2 hours is 0.5 mg $CN^-/l$ and after standing for 50 hours at room temperature is 8 mg $CN^-/l$.

A process primarily for the detoxification of waste waters of acrylonitrile plants which then are subsequently supplied to a biological sewage treatment plant consists of using a formaldehyde solution having a pH of 3 or lower (German Pat. No. 2202660), namely in molar excess; preferably 1.5 to 4 moles of formaldehyde are employed per mole of cyanide.

This continuous process, however, can only be controlled by a wet analytical determination of the cyanide content in the waste water, since according to the data in the patent the establishment of the equilibrium takes place so quickly that it cannot be measured with a silver iodide electrode.

However, it cannot be seen from the examples how the strongly fluctuating amounts of waste water—there are mentioned amounts between 20 and 40 m³/h having cyanide contents of 20 to 300 ppm—can be detoxified without problems without electrometric control, in any event it can be seen from the examples that even upon addition of four times the amount of formaldehyde, based on the cyanide content, the limit on cyanide ions of less than 0.1 mg $CN^-/l$ required today in no case is reached. Glycolonitrile according to this process should not be formed, but there is an unknown reaction, apparently with formation of pyrimidones.

SUMMARY OF THE INVENTION

Therefore, the invention is directed to a process for converting hydrogen cyanide in gases and/or gas wash water quantitatively into glycolonitrile by dosing in of industrial, commercial formaldehyde under electrometric control, without requiring that a large excess of formaldehyde, based on the cyanide, be employed, whereupon a detoxification of the glycolonitrile results.

A control of the formaldehyde dosing via a direct measurement of the redox potential in the waste water is eliminated since in the reaction of formaldehyde with cyanide in the pH range of 1 to 12 the influence of the redox potential by the pH differences is too great.

It has now been found that the purification of industrial gases or waste gases which contain hydrogen cyanide and preferably ammonia, and which is carried out by a circulating wash with water and formaldehyde as well as a simultaneous oxidation of the circulating water or subsequent oxidative treatment of the wash water removed from the circuit, whereby in both cases there can be connected a biological subsequent purification, can be followed and controlled pontentiometrically if the formaldehyde is dosed into the gas wash circuit before the gas washer and the amount added is controlled via a continuous measurement of the redox potential with a pair of electrodes consisting of a noble metal and a reference electrode in a continuous side stream (=measuring stream) branched off after the washer, which side stream is adjusted by dosing in of alkali or acid to a pH having a constant value between 7 and 10, preferably 8 to 8.5, in the presence of at least 1 ppb of silver ions.

The gases to be purified can contain additionally carbon oxides, hydrocarbons of different structures, hydrogen sulfide, sulfur oxides, or heavy metal containing dusts. Preferably, the measuring stream is withdrawn between the gas washer and the sedimentation apparatus. This small measuring stream, e.g., about 100 liters/h is branched off and adjusted to a constant pH by automatically controlled dosing in of alkali or acid. Simultaneously, a stable silver compound is dosed into the solution, in a given case together with the acid, and a silver concentration of at least 1 ppb silver ions maintained in the measuring stream. A preferred upper limit is 10 ppb silver ions. Generally, however, 1 ppb silver ions is sufficient for carrying out the measurement. Larger silver concentrations, e.g., 100 mg/m$^3$, do not disturb the process, but can lead to a disadvantageous influence in a biological sewage plant or a natural waters. The main stream according to the process of the invention is not changed in regard to its pH.

A dosing pump is controlled according to the redox potential measurement in the measuring stream via an electronic control having P (proportional), PI (proportional-integral), or PID (proportional-integral-differential) properties, which pump doses the corresponding amount of a commercial formaldehyde solution into the ring conduit of the main stream before the gas washer. In place of the commercial formaldehyde quality, there can also be employed diluted or gaseous formaldehyde.

Hereby, if there is used, e.g., a gold-thalamide electrode pair redox potential in the measuring stream reaches a value in the range of about +400 mV±50 mV and +1000 mV±50 mV in a pH range of 7 to 10, preferably 8 to 8.5, as soon as the reaction of the cyanide with the formaldehyde is ended.

A preferred redox index value is between +650 mV±50 mV and 850 mV±50 mV, especially preferred at +700 mV±50 mV, at a pH of 8 to 8.5. If a silver electrode is employed instead of a gold electrode, then the redox index value after reaching the end product of the reaction between cyanide ions and formaldehyde is about 100 mV lower. The establishment of the optimum index value must be ascertained by a previous small scale experiment. The corresponding is also true for other electrode couple-combinations. By dosing in the formaldehyde solution before the gas washer and measuring the redox potential in the measuring stream after the gas washer, on the one hand the hydrogen cyanide contained in the gas to be washed is immediately quantitatively converted into glycolic acid nitrile; on the other hand, however, a reaction of hydrogen cyanide with metals forming heavy metal cyanides which are difficult to detoxify is avoided. Besides at high ammonia contents in the wash water, hexamethylenetetramine can be formed with the formaldehyde in the wash water, which in the same manner sets free formaldehyde again, as is required for the reaction with the hydrogen cyanide with formation of glycolonitrile.

For this reaction a maximum reaction time of 2 minutes is necessary which always can be maintained in the process by the arrangement of the measuring and dosing places. Furthermore, in this manner it can be guaranteed that no free formaldehyde is present in the wash circuit, because through the redox controlled amount of dosage on the one hand there is only dosed in the amount stoichiometrical to the cyanide content and on the other hand in the presence of high $NH_3$ contents an unplanned slight excess is converted into biologically readily decomposable hexamethylenetetramine. To destroy the glycolonitrile formed, there is carried out an oxidative treatment of the wash circulation or of the wash water excluded from the circulation.

Above all there is suited as oxidation agent hydrogen peroxide. Preferably, there are used hydrogen peroxide solutions having a concentration of 10 to 70 wt.%. A further important effect which is produced by the process of the invention is the reduction of the hydrogen cyanide discharge from the evaporation coolers. The cooling circulations operating in the metallurgical works must be equipped with evaporation coolers to maintain a sufficient cooling water temperature. In a laboratory experiment adjusted to the operating proportions, it was established that from a blast furnace gas wash water loaded with 10 mg $CN^-/l$ there results a waste gas containing 15 ppm of hydrogen cyanide, while the waste gas of a blast furnace gas wash water of the same initial cyanide concentration but treated with formaldehyde contains only 2 ppm of hydrogen cyanide.

Because of the increase in concentration of the wash water and the accompanying depositions in the gas washers, it is very favorable to continuously remove some wash water from the circuit and replace it with fresh water; in place of the wash circulation now this removed water is adjusted with lime or alkali liquor (aqueous sodium hydroxide) to a pH of 8.5 to 12.5, preferably to 10.5, and controlled potentiometrically, e.g., $H_2O_2$ added, until the redox potential measured with a gold-thallium amalgam/thallium chloride pair of electrodes reaches +700 mV±50 mV. The change in potential occurring thereby on the one hand can be used to signal the end of the detoxification reaction or in continuous dosing of oxidation agent to stop the dosing. A biological treatment, e.g., in a correspondingly adapted sewage treatment plant can, as stated, be connected to the process.

The process of the invention above all is usable with inorganic cyanides such as occur in wash water of metallurgical works, garbage pyrolysis as well as in factories, which operate with or produce hydrocyanic acid or cyanide. Since the measuring stream is withdrawn at the place of the strongest cyanide ion concentration of the wash water, the addition of the formaldehyde in the wash circuit before introduction into the gas washer is always so regulated that this addition in each case also is sufficient with fluctuating concentrations of cyanide ions. This is a decisive advantage of the process of the invention. Besides the gas washer can be operated in pH ranges in which the carbon dioxide of the air is not absorbed.

Previously, it was necessary to operate in the pH range >13 in order to guarantee a complete separation of the hydrogen cyanide and carbon dioxide. This is necessary because carbonic acid is a stronger acid than hydrocyanic acid and in the lower pH range carbon dioxide is preferentially absorbed by the wash water. Therefore, according to the process of the invention, there is effected a clearly lower loading of the waste water with neutral salt than was previously the case. This is a basic advantage of the process of the invention. The pH range of the wash water does not need to be changed for reasons of an undesired absorption of gases, such as the absorption of carbon dioxide nor for reasons of the effective carrying out of the process of the invention. It can vary within wide limits, but generally is below pH 7. Indeed in individual cases, such as in the waste gas treatment, in the production of ferromanganese pH values between 10 and 11 are possible.

All these waste waters can be employed in the process of the invention unchanged in pH. Adjustment to a pH preferably of 8 to 8.5 is only in the measuring stream. It should also be emphasized that even large amounts of ammonium ions, sulfide ions, as occur in the waste waters of the blast furnace industry and refuse pyrolysis, do not disturb the measurement in the measuring stream (for the determination of the influence of ammonia on the necessary amount of formaldehyde see Examples 3 and 4). For further explanation of the process of the invention, there are presented the following two principles for carrying out the process.

DETAILED DESCRIPTION

Figure 1:
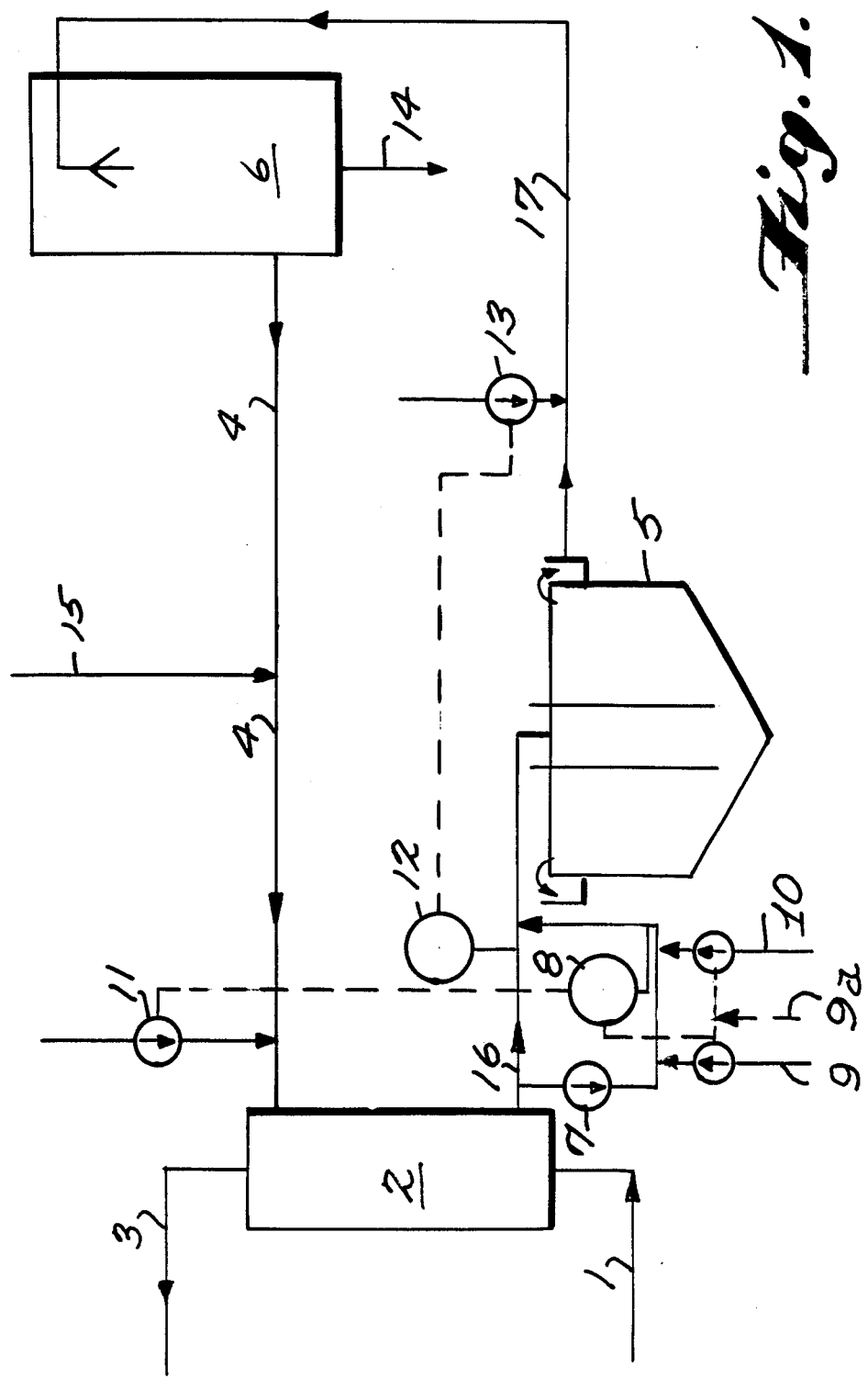
FIG. 1 illustrates one principle for carrying out the process of the invention.
Figure 2:
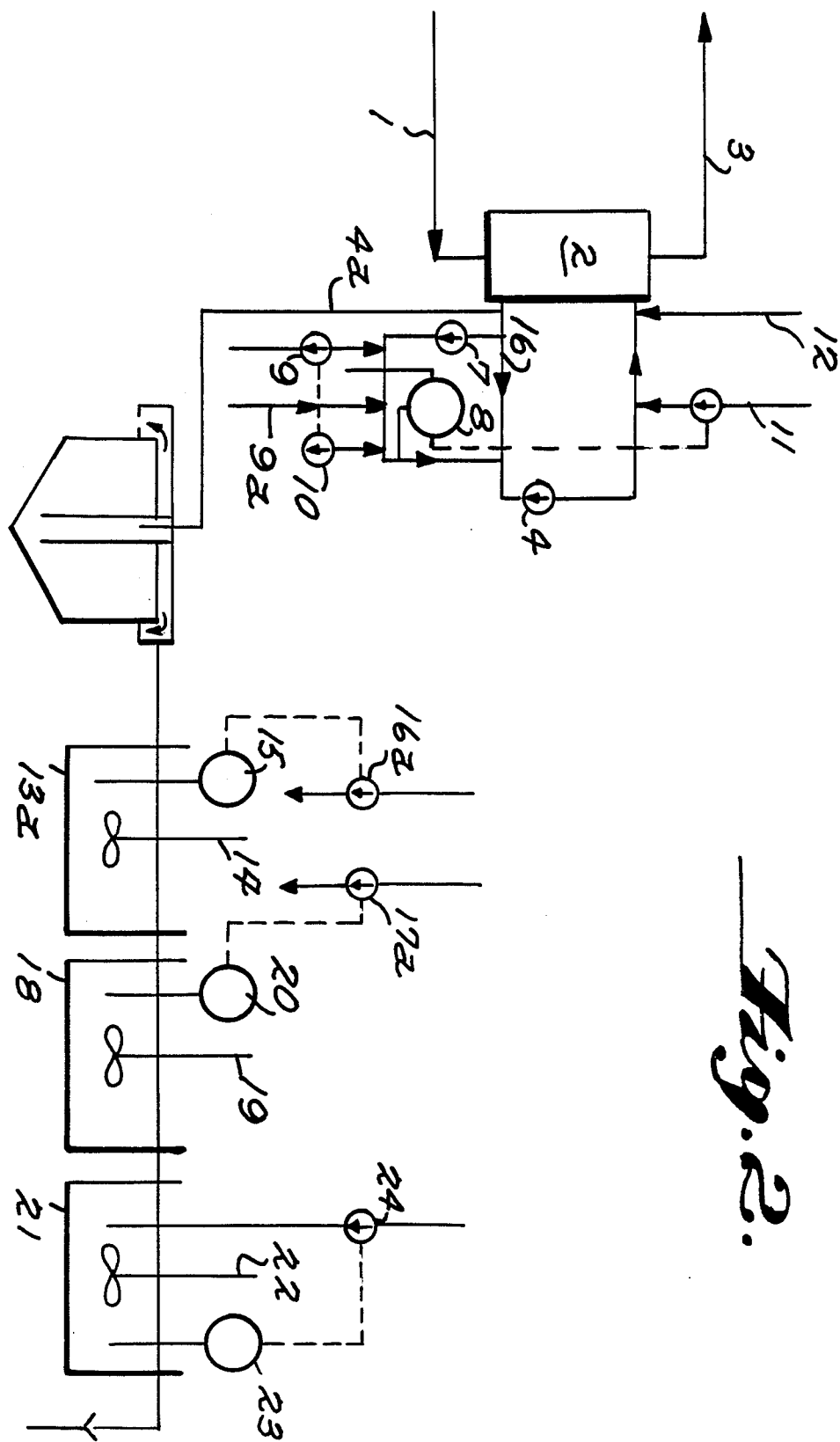
FIG. 2 illustrates the other principle for carrying out the process of the invention.

The two types of carrying out the process of the invention as shown in FIGS. 1 and 2 can be carried out either individually or in combination, adjusted to any situation which may be present. Thus, for example, there can be used the procedure according to FIG. 1 in place of the wash circuit in FIG. 2, i.e., in place of the system: "gas washer—measuring stream—actual wash circuit". In this last case, then there is eliminated a dosing of oxidation agent in the wash circuit. In FIG. 1 there is represented the gas wash with formaldehyde and simultaneous oxidation with hydrogen peroxide in the circulating system. The raw gas is led via line 1 from below into the gas washer 2 and the purified gas withdrawn via line 3. The wash water is supplied from above countercurrently via line 4 to the gas washer 2 and drawn off via line 16.

The suspended material contained in the wash water is separated off in the sedimentation apparatus 5, e.g., a round scraper, and the wash water thereupon supplied via line 17 to the cooler 6, e.g., an evaporation cooler. From there it goes again via line 4 into the gas washer 2.

The wash circuit includes the lines 4, 16, and 17 as well as gas washer 2, sedimentation tank 5, and cooler 6.

After the gas washer 2, a small measuring stream 7 is drawn off from the wash circuit and controlled via a control 8, by addition of acid via line 9 or alkali via line 10 adjusted to a pH of, e.g., 8 to 8.5. Depending on the redox potential likewise measured with controller 8 and the deviation ascertained thereby formaldehyde is dosed via line 11 into the wash circuit before entrance into the washer 2. The silver compound, e.g., nitrate, enters into measuring stream 7 via line 9a.

The redox potential of the wash circuit which is not changed in pH is measured with controller 12 and hydrogen peroxide dosed in via line 13 after the round scraper 5 depending on the ascertained control deviation. The residence time in the cooler as well as in the entire wash cycle is used as reaction time for the perhydrolysis of the glycolonitrile formed in the gas washer 2. The water decanted from the cooler 6, which likewise must be changed in pH and is withdrawn via line 14 is replaced by addition of a corresponding amount of fresh water via line 15 after the cooler 6.

In FIG. 2 there is represented the gas wash with formaldehyde and separate oxidative treatment of the gas wash water with hydrogen peroxide. The raw gas is led via line 1 from below the gas washer 2 and the purified gas drawn off via line 3. The wash water is supplied countercurrently via line 4 from above to the gas washer and drawn off via line 4a. The suspended material contained in the wash water is removed in the sedimentation apparatus 5 and then supplied to the detoxification plant.

A small measuring stream 7 is drawn off from the wash circuit out of line 16 after the gas washer 2 and controlled via a controller 8 by addition of alkali via line 9 or acid via line 10 and adjusted to a pH of 8 to 8.5, with addition of a silver compound via line 9a.

Depending on the redox potential likewise measured with controller 8 and the deviation ascertained thereby, formaldehyde is dosed via line 11 into the wash cycle, i.e., in line 4 before introduction into washer 2. Simultaneously, before the gas washer 2 there is added as much fresh water via line 12 as is decanted via line 4a. The ratio of the decanted water to the amount in the wash circuit is determined by the contamination and degree of hardness of the wash water. This is established by a preliminary experiment.

The water flowing out of the sedimentation apparatus 5 is next led to the first reaction tank 13a which is equipped with a stirrer 14, a pH measuring and control device 15 as well as an alkali dosing line 16a and a $H_2O_2$ dosing line 17a. Here the pH of the waste water being treated, in case it is necessary, is next adjusted to a pH of >10.5. In the second tank 18 which is equipped with a stirrer 19 as well as a redox measuring and control device 20, depending on the redox potential measured and the deviation thereby established, there is dosed in the corresponding amount of $H_2O_2$ via line 17a into the first reaction tank 13a. The size of the reaction tank thereby is regulated so that there is produced a sufficient residence time depending on the waste water stream in order to guarantee a complete perhydrolysis of the glycolonitrile. The potentiometric supervision of the reaction is carried out via controller 20.

Subsequently, the oxidatively treated water is led into the third reaction tank 21 which is equipped with a stirrer 22, a pH measuring and control device 23 as well as an acid dosing line 24. Here the waste water is adjusted to the pH prescribed for carrying it off.

The process can comprise, consist essentially of, and consist of the stated steps with the recited materials.

The invention is further explained in the following examples.

EXAMPLE 1

In Example 1, there is shown the degree of effectiveness which can be produced through potentiometrically controlled addition of formaldehyde.

A wash circuit containing 5 m³ and a revolution of 60 m³/h had the following composition:

| | |
|---|---|
| Direct argentometric determinable cyanide | 83 mg $CN^-$/l |
| Total cyanide, DIN 38 405, D 13.1 | 135 mg $CN^-$/l |
| Free $NH_3$ | 3800 mg $NH_3$/l |
| Total $NH_3$ | 3800 mg $NH_3$/l |
| Iron, total | 46.5 mg Fe/l |

(DIN 38405 is German Industrial Standard 38405)

There were added to and withdrawn from the circuit per hour 2 m³ of water. After 8 hours of operation by electrometrically controlled dosing of an average of 48 kg $H_2CO$ (37 wt.%) per hour before the gas washer, there were ascertained in the waste water the following analysis values:

| | |
|---|---|
| Direct argentometric determinable cyanide | 629 mg $CN^-$/l |
| Free $NH_3$ | 490 mg $NH_3$/l |
| Total $NH_3$ | 3900 mg $NH_3$/l |
| Iron, complex bound | 1.2 mg Fe/l |
| Iron, total | 1.2 mg Fe/l |

It was the object of this experiment to completely convert the hydrogen cyanide into glycolonitrile and to reduce the free ammonia to <600 mg $NH_3$/l. The residual $NH_3$ should be converted by $H_2CO$ addition into hexamethylenetetramine. According to the analytical data for this purpose, there had to be added on the average 52.7 kg of $H_2CO$ (37 wt.%). The content of total cyanide according to DIN 38405, D 13.1 could not be determined since the cyanide present as glycolonitrile is only incompletely detected by this analytical method. From the content of complex bound iron, there is calculated a content of 3.35 mg $CN^-$/l as complex iron cyanide. Consequently, there is produced a reduction of the initial content of 52 mg $CN^-$ to 3.35 mg $CN^-$, thus around 95%. In other words: the renewed formation of complex heavy metal cyanides is prevented by the addition of formaldehyde.

After the oxidative treatment of this waste water with $H_2O_2$, the content of total cyanide could be reduced to <1 mg $CN^-$/l and the content of easily liberatable cyanide according to DIN 38405, D 13.2, to <0.1 mg $CN^-$/l.

EXAMPLE 2

In Example 2 there is shown the significance of the adjustment of the pH for the exact formaldehyde dosage, as is later taken up on the measuring stream in Examples 5 and 6.

Example 2 is carried out without the measuring stream.

A wash circuit of 4000 m³ content and a revolution of 1400 m³/h had the following composition:

| | |
|---|---|
| Direct argentometric determinable cyanide | 260 mg $CN^-$/l |
| Total cyanide, DIN 38 405, D 13.1 | 325 mg $CN^-$/l |
| Easily liberatable cyanide, DIN 38 405, D 13.2 | 264 mg $CN^-$/l |
| Manganese | 1.2 mg Mn/l |
| Complex iron cyanide | 110 mg $CN^-$/l |

There were added to the circuit within 3 hours 2500 liters of $H_2CO$ (37 wt.%) and then there were continuously dosed in 20 kg/h of $H_2CO$ (37 wt.%).

The waste water changed as a function of time within 72 hours as follows, 20 m³ per hour was decanted and replaced by fresh water.

TABLE

| Time hours | Cyanide Total mg $CN^-$/l | Cyanide Easily Liberatable mg $CN^-$/l | Manganese mg MN/l | Cyanide as $[Fe(CN)]^4$ mg $CN^-$/l | Formaldehyde Addition |
|---|---|---|---|---|---|
| 0 | 325 | 264 | 1.2 | 110* | 2750 kg |
| 24 | 245 | 187 | 0.7 | n.d.** | 20 kg/h |
| 29 | n.d.** | n.d.** | — | 77.5* | 20 kg/h |
| 48 | 193 | 156 | 0.4 | 42.6 | 20 kg/h +950 kg |
| 51 | 214 | 171 | 0.3 | 40.6* | 20 kg/h |
| 72 | 272 | 208 | 0.2 | 38.5* | 20 kg/h |

*calculated from Fe-content (AAS = atomic absorption spectroscopy)
**not determined In all within 48 hours 4000 m³ of wash water+900 m³ of discharged water were treated with $H_2CO$. For this purpose, there would be required to be added at an average content of 250 mg $CN^-$/l 3820 kg of $H_2CO$ (37 wt.%). In all there were added 4850 kg. The somewhat higher dosage amount was traced back to the fact that the wash cycle had a pH of 10.1 to 10.5 and was not changed. This led to an unfavorable influence on the redox potential and therewith to overdosing of $H_2CO$, based on the cyanide content.

Although only about 22% of the cycling liquid was replaced by fresh water, there could be produced by the $H_2CO$ dosing not only a decisive improvement in the settling behavior of the suspended material but also a reduction of the manganese content of more than about 80% and of the content of complex iron cyanide of around 65%.

Following Examples 3 and 4 are laboratory experiments to ascertain the influence of larger ammonia concentrations on the amount of formaldehyde required to be dosed.

EXAMPLE 3

4 liters of an aqueous solution containing 300 mg $CN^-$/l, 4000 mg $NH_3$/l, and 1 μg Ag/l were adjusted with hydrochloric acid (25 wt.%) to a pH of 8.5 and treated with $H_2CO$ (37 wt.%) added in portions. Thereby, the redox potential measured with an Au/-Thallium amalgam-thallium chloride electrode pair increased already after the addition of 4% $H_2CO$ of theory, based on the cyanide and ammonia contents, from +380 mV to +675 mV and did not change significantly up to an addition of 30% of theory of $H_2CO$. 4% $H_2CO$ of theory corresponds to 126% of theory, based on the cyanide; 30% of theory of $H_2CO$, however, corresponds already to 950% of theory, based on the cyanide.

It can be seen from Example 3 that even at high ammonia content the formaldehyde added is preferably consumed in conversion of the cyanide. This is shown by the fact that the potential is no longer changed. The excess formaldehyde is reacted to hexamethylenetetramine.

EXAMPLE 4

A solution according to Example 3 (pH 8 to 8.5) was treated with 1.38 grams of $H_2CO$ corresponding to 100% of theory, based on the cyanide, and the course of the redox potential measured. The initial potential of +380 mV increased quickly to +580 mV; after a total of 2 minutes there was reached the final potential of +670 mV. With only 100% of theory, there was thus obtained the same final value as in Example 3 with 950% of theory. Thus, it is an absolutely safe method of control.

This potential was not changed by subsequent addition of 120% of theory of aqueous hydrogen peroxide (50 wt.%), based on the cyanide. Only by addition of 3.8 times the amount of $H_2O_2$, based on the cyanide, there occurred at pH 8.5 an increase in potential to +700 mV and which remained constant over 2 hours.

Therewith, it is guaranteed that the process for control of the formaldehyde dosing also can be operated without problems if a large excess of oxidizing agent is present in the pH range of 8 to 8.5.

The thus treated solution was then adjusted to pH 10.5 with aqueous sodium hydroxide (10 wt.%). Thereby, the potential dropped to +400 mV. Through perhydrolysis of the glycolonitrile with the $H_2O_2$, however, within 10 minutes there resulted an increase in potential to +750 mV, through which there was signaled the end of the detoxification. There could be analytically detected with the pyridine-barbituric acid reagent that the cyanide content was decreased to <0.1 mg $CN^-/l$.

According to this example, it is necessary merely to branch off a small partial stream of the circulating wash liquid and to condition it. Thereby, the measurement of the redox potential at pH 8.5 used for the automatic $H_2CO$ dosing can also be carried out in the presence of oxidizing agents, such as, e.g., $H_2O_2$. Through this it is possible if the pH of the circuit, for example, in the production of ferromanganese, is adjusted automatically to 10 to 11, to carry out the oxidative treatment already in the circulating liquid and only post treat the discharged water in case it is necessary.

Examples 5 and 6 are practical examples of the process of the invention according to FIGS. 1 and 2.

EXAMPLE 5

A cool circuit (FIG. 1) containing 4200 m$^3$, 800 m$^3$ revolution/h as well as 100 m$^3$ decantation per hour had the following composition:

| | |
|---|---|
| Total cyanide, DIN 38 405, D 13.1 | 78.5 mg $CN^-/l$ |
| Easily liberatable cyanide, DIN 38 405, D 13.2 | 67.4 mg $CN^-/l$ |
| Ammonia | 35 mg $NH_3/l$ |
| pH | 9.8 |

There were withdrawn from the cool aut circuit after the gas washer a measuring stream of 100 l/h and the measuring stream continuously controlled via an electronic pH controller to pH 8 to 8.5 by dosing in hydrochloric acid. Simultaneously, there was dosed in a silver nitrate solution in order to maintain an Ag concentration of 1 µg/l. By measuring the redox potential with an Au/Thallium amide-Thallium chloride electrode pair before the gas washer there was dosed in sufficient formaldehyde solution (37 wt.%), controlled by an electronic redox controller, that a constant redox potential of +675 mV was maintained after the gas washer.

Simultaneously, there was measured in the main stream after the gas washer the redox potential with a second Au/Th-Th-electrode pair. Depending on the measured redox potential in the main stream at pH 9.8, there was dosed into the main stream before the gas cooler sufficient $H_2O_2$ that a constant redox potential of +750 mV was reached.

Through this measuring and dosing arrangement, there were ascertained the following dosing amounts and effective components:

Formaldehyde dosing over 16 hours:
Average 20.2 l/h, (37 wt. %), corresponding to 7.12 kg $CN^-$/h
100 m$^3$ waste water/h containing 67.4 mg $CN^-/l$ = 6.74 kg $CN^-$/h
Formaldehyde added: 105% of Th. based on $CN^-$
$H_2O_2$ dosing over 16 hours:
Average 30 l (50 Wt. %)/h The cyanide content at the overflow after the gas cooler fluctuated between 0.1 and 0.3 mg $CN^-/l$; at the inlet into the works sewage system (1 hour residence time) there was always registered a value of <0.1 mg $CN^-/l$.

EXAMPLE 6

A wash circuit (FIG. 2) containing 5 m$^3$ and a revolution of 60 m$^3$/h had the following composition:

| | |
|---|---|
| Direct agentometrically determinable cyanide (Average over 16 hours) | 535 mg $CN^-/l$ |
| Ammonia (Average over 16 hours) | 3650 mg $NH_3/l$ |
| pH | 7.9 |

There were withdrawn from the circuit before the washer a measuring stream of 100 l/h and the measuring stream continuously controlled via an electronic pH controller to pH 8 to 8.5 by dosing in sodium hydroxide solution (10 wt.%). Simultaneously, there was dosed in a silver nitrate solution in order to maintain an Ag concentration of 1 µg/l. By measuring the redox potential with an Au/Thallium amide-Thallium chloride electrode pair before the gas washer there was dosed in sufficient $H_2CO$ (37 wt.%), controlled by an electronic redox controller, that a constant redox potential of +675 mV was maintained after the gas washer. 2 m$^3$/h of wash water/h were replaced by fresh water. Through this arrangement of the measuring and dosing device there was needed the following dosage amount of $H_2CO$ (37 wt.%).

Average per hour, there were dosed in 3.2 liters of $H_2CO$ (37 wt.%); which is 106% of theory based on the cyanide content of the wash water discharged.

The discharged wash water after separation of the suspended material was next adjusted to a pH of 10.5 with sodium hydroxide solution and then by redox measurement with an Au/Thallium amide-Thallium chloride electrode pair controlled via an electronic controller there was dosed in sufficient $H_2O_2$ (50 wt.%) that the redox potential increased to +750 mV and this value was maintained with the continuous treatment of waste water. After a total reaction time of 3.5 hours, corresponding to the size of the plant provided, it could then be back neutralized to a pH of 8.5. The cyanide content in the first reaction tank (about 1 hour reaction time) was always $<0.1$ mg $CN^-/l$.

The entire disclosure of German priority application No. P3534677.9 is hereby incorporated by reference.

What is claimed is:

1. In a process for the purification of industrial gas or waste gases which contain hydrogen cyanide by a circulating wash with water and formaldehyde and a simultaneous oxidative treatment or a subsequent oxidative treatment of the circulating water removed from the circuit the improvement comprising dosing the formaldehyde into the gas wash circuit before the gas washer and controlling the amount of formaldehyde added so that it is stoichiometrically equal to the cyanide content by continuously measuring the redox potential with a pair of electrode consisting essentially of a noble metal and a reference electrode in a measuring side stream branched off after the washer and controlling the pH of the side stream to a pH between 7 and 1 by dosing in alkali or acid in the presence of at least 1 ppb of silver ions.

2. A process according to claim 1 wherein the industrial or waste gas employed contains ammonia.

3. A process according to claim 1 wherein the industrial or waste gas employed contains at least one member of the group consisting of carbon oxides, hydrocarbons, hydrogen sulfide, sulfur oxides, and heavy metal containing dust.

4. A process according to claim 1 wherein the pH is controlled to 8.0 to 8.5.

5. A process according to claim 1 wherein there is employed a gold-thalamide electrode pair and the redox nominal value at a pH of 7 to 10 is adjusted to $+400$ mV$\pm 50$ mV to $+1000$ mV$\pm 50$ mV.

6. A process according to claim 1 wherein there is employed a gold-thalamide electrode pair and the redox nominal value at a pH of 8 to 8.5 is adjusted to $+400$ mV$\pm 50$ mV to $+1000$ mV$\pm 50$ mV.

7. A process according to claim 6 wherein the redox nominal value is adjusted to $+650$ mV$\pm 50$ mV to $+850$ mV$\pm 50$ mV.

8. A process according to claim 7 wherein the redox nominal value is adjusted to 700 mV$\pm 50$ mV.

9. A process according to claim 8 wherein the measuring stream contains 1 ppb of silver ions.

10. A process according to claim 7 wherein the measuring stream contains 1 ppb of silver ions.

11. A process according to claim 7 wherein the measuring stream contains a maximum of 10 ppb of silver ions.

12. A process according to claim 1 wherein the measuring stream contains a maximum of 10 ppb of silver ions.

13. A process according to claim 12 comprising removing a portion of the wash water from the circuit after the formaldehyde treatment, establishing a pH of 8.5 to 12.5 in the removed wash water and treating the removed wash water with sufficient oxidizing agent to completely hydrolyze the glycolonitrile formed in the formaldehyde treatment.

14. A process according to claim 13 wherein the oxidizing agent is hydrogen peroxide.

15. A process according to claim 9 comprising removing a portion of the wash water from the circuit after the formaldehyde treatment, establishing a pH of 8.5 to 12.5 in the removed wash water and treating the removed wash water with sufficient oxidizing agent to completely hydrolyze the glycolonitrile formed in the formaldehyde treatment.

16. A process according to claim 15 wherein the oxidizing agent is hydrogen peroxide.

17. A process according to claim 7 comprising removing a portion of the wash water from the circuit after the formaldehyde treatment, establishing a pH of 8.5 to 12.5 in the removed wash water and treating the removed wash water with sufficient oxidizing agent to completely hydrolyze the glycolonitrile formed in the formaldehyde treatment.

18. A process according to claim 17 wherein the oxidizing agent is hydrogen peroxide.

19. A process according to claim 1 comprising removing a portion of the wash water from the circuit after the formaldehyde treatment, establishing a pH of 8.5 to 12.5 in the removed wash water and treating the removed wash water with sufficient oxidizing agent to completely hydrolyze the glycolonitrile formed in the formaldehyde treatment.

20. A process according to claim 19 wherein the oxidizing agent is hydrogen peroxide.

21. A process according to claim 19 including the steps of continuously measuring the redox potential in the main stream after the gas washer and dosing into the main stream before the gas cooler sufficient oxidizing agent to maintain the redox potential constant.

22. A process according to claim 21 wherein the oxidizing agent is hydrogen peroxide.

* * * * *